United States Patent
Makke et al.

(10) Patent No.: US 10,812,592 B2
(45) Date of Patent: *Oct. 20, 2020

(54) METHOD AND APPARATUS FOR UTILIZING NFC TO ESTABLISH A SECURE CONNECTION

(71) Applicant: FORD GLOBAL TECHNOLOGIES, LLC, Dearborn, MI (US)

(72) Inventors: Omar Makke, Lyon Township, MI (US); Oleg Yurievitch Gusikhin, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/381,727

(22) Filed: Apr. 11, 2019

(65) Prior Publication Data

US 2019/0238639 A1    Aug. 1, 2019

Related U.S. Application Data

(63) Continuation of application No. 14/940,885, filed on Nov. 13, 2015, now Pat. No. 10,284,653.

(51) Int. Cl.
| | |
|---|---|
| *G06F 7/04* | (2006.01) |
| *H04L 29/08* | (2006.01) |
| *H04B 5/00* | (2006.01) |
| *H04W 76/14* | (2018.01) |
| *H04W 4/80* | (2018.01) |
| *H04L 29/06* | (2006.01) |
| *H04W 12/06* | (2009.01) |
| *H04W 12/04* | (2009.01) |
| *G06F 15/16* | (2006.01) |

(52) U.S. Cl.
CPC .......... *H04L 67/12* (2013.01); *H04B 5/0031* (2013.01); *H04L 63/0492* (2013.01); *H04L 63/061* (2013.01); *H04L 63/08* (2013.01); *H04W 4/80* (2018.02); *H04W 12/0401* (2019.01); *H04W 12/06* (2013.01); *H04W 76/14* (2018.02)

(58) Field of Classification Search
CPC . H04L 67/10; H04L 9/32; H04L 63/08; H04L 63/12; H04L 63/0876; H04L 9/0894; H04L 9/3247; H04L 9/14; H04L 63/06; H04L 63/10; H04L 67/12; H04B 5/0031; H04W 4/008; H04W 76/023
See application file for complete search history.

(56) References Cited

U.S. PATENT DOCUMENTS

| | | | | |
|---|---|---|---|---|
| 6,470,449 | B1 * | 10/2002 | Blandford | G06F 21/34 713/178 |
| 9,162,648 | B1 * | 10/2015 | Weng | B60R 25/24 |
| 9,365,188 | B1 * | 6/2016 | Penilla | G07F 15/005 |
| 2004/0170068 | A1 * | 9/2004 | Williams | G06F 21/73 365/200 |

(Continued)

*Primary Examiner* — Gary S Gracia
(74) *Attorney, Agent, or Firm* — Michael Spenner; Brooks Kushman P.C.

(57) ABSTRACT

A system includes a processor configured to approve an application vehicular-system-access request based on a temporary key and device ID transmitted with the access request matching a stored temporary key and device ID pair previously stored by the processor. This can assist in ensuring that only validated devices and/or applications are requesting access to a vehicle system.

18 Claims, 3 Drawing Sheets

(56) References Cited

U.S. PATENT DOCUMENTS

| | | | |
|---|---|---|---|
| 2006/0238296 A1* | 10/2006 | Konno | B60R 25/1003 340/5.61 |
| 2008/0148409 A1* | 6/2008 | Ampunan | G06F 21/57 726/26 |
| 2009/0184800 A1* | 7/2009 | Harris | G08C 17/00 340/5.21 |
| 2010/0234071 A1* | 9/2010 | Shabtay | H04B 7/155 455/562.1 |
| 2011/0210820 A1 | 9/2011 | Talty et al. | |
| 2011/0215901 A1* | 9/2011 | Van Wiemeersch | B60R 25/04 340/5.54 |
| 2011/0238260 A1* | 9/2011 | Kotani | G06F 21/445 701/31.4 |
| 2012/0253552 A1* | 10/2012 | Skelton | H04M 1/72577 701/2 |
| 2012/0254960 A1* | 10/2012 | Lortz | H04W 12/08 726/7 |
| 2012/0287022 A1* | 11/2012 | Queen | G09G 5/006 345/2.1 |
| 2013/0035117 A1* | 2/2013 | Litkouhi | H04L 67/12 455/456.4 |
| 2013/0238165 A1* | 9/2013 | Garrett | G06F 17/00 701/2 |
| 2013/0259232 A1* | 10/2013 | Petel | G07C 9/00857 380/270 |
| 2013/0317693 A1* | 11/2013 | Jefferies | G07B 15/00 701/31.5 |
| 2014/0040621 A1* | 2/2014 | Klimke | H04W 12/0023 713/171 |
| 2014/0058586 A1* | 2/2014 | Kalhous | G07C 9/00309 701/2 |
| 2014/0194056 A1 | 7/2014 | Barrett et al. | |
| 2014/0225724 A1* | 8/2014 | Rankin | B60K 35/00 340/438 |
| 2014/0266594 A1* | 9/2014 | Reiser | G06F 3/04842 340/5.72 |
| 2014/0365781 A1* | 12/2014 | Dmitrienko | G06F 21/34 713/185 |
| 2015/0038073 A1 | 2/2015 | Vang et al. | |
| 2015/0148018 A1* | 5/2015 | Rose | H04M 1/72577 455/418 |
| 2015/0161832 A1* | 6/2015 | Esselink | B60R 25/24 340/5.22 |
| 2015/0310681 A1* | 10/2015 | Avery | B60R 25/209 340/5.61 |
| 2015/0356797 A1* | 12/2015 | McBride | G07C 9/29 340/5.61 |
| 2015/0371467 A1* | 12/2015 | Wang | G07C 9/00309 340/5.26 |
| 2016/0004281 A1* | 1/2016 | Fischer | B60K 35/00 710/304 |

\* cited by examiner

METHOD AND APPARATUS FOR UTILIZING NFC TO ESTABLISH A SECURE CONNECTION

CROSS-REFERENCE TO RELATED APPLICATIONS

This application is a continuation of U.S. application Ser. No. 14/940,885 filed Nov. 13, 2015, now U.S. Pat. No. 10,284,653, issued on May 7, 2019, the disclosure of which is hereby incorporated in its entirety by reference herein.

TECHNICAL HELD

The illustrative embodiments generally relate to a method and apparatus for utilizing near field communication (NFC) to establish a secure connection.

BACKROUND

With the increasing integration of computers and wireless connectability within vehicles, there is increasing concern about the security of vehicular computing systems. Previously, when computers were integrated into vehicles, but no wireless access or connectability existed within the vehicle, it was fairly difficult to infiltrate these computing systems without physically accessing the vehicle. With the inclusion of wireless connections, e.g., BLUETOOTH, WiFi, etc., there is a possibility of outside malicious devices utilizing the wireless connections to attack and access vehicle computing systems.

Mobile applications, designed to interact with the vehicle computers, are developed utilizing modern programming languages. While the applications may be approved to access the vehicle computers, these applications can also be reverse engineered. Since the authentication codes and protocols that grant permission to the application to interact with the vehicle computers (such as, for example, an application ID) are often integrated into the application, reverse engineering of the application can result in a hacker obtaining the application ID). In other instances, the application ID can simply be obtained by monitoring data between a mobile device and the vehicle. Once obtained, the application ID can be coded into a malicious application to trick the vehicle computer into thinking a valid application is attempting to connect to the vehicle computer.

SUMMARY

In a first illustrative embodiment, a system includes a processor configured to approve an application vehicular-system-access request based on a temporary key and device ID transmitted with the access request matching a stored temporary key and device ID pair previously stored by the processor.

In a second illustrative embodiment, a system includes a programmable vehicular near-field communication (NFC) device and a processor in communication with the NFC device. In this embodiment, the processor is configured to generate an initial random key and deliver the initial random key to the NFC device. Also, the NFC device is configured to provide the initial random key via NFC to a requesting mobile device and to receive a device ID from the requesting mobile device. The processor is further configured to receive the device ID from the NFC device and store the device ID in conjunction with the initial random key.

In a third illustrative embodiment, a computer-implemented method includes receiving an access request from an application executing on a mobile device, requesting access to a vehicular system and including a device ID and a random key. The method further includes comparing the device ID and random key to a list of previously stored device ID and random key pairs and approving the access request, via a vehicle computer, based on a match between both the device ID and random key and one of the stored device ID and random key pairs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
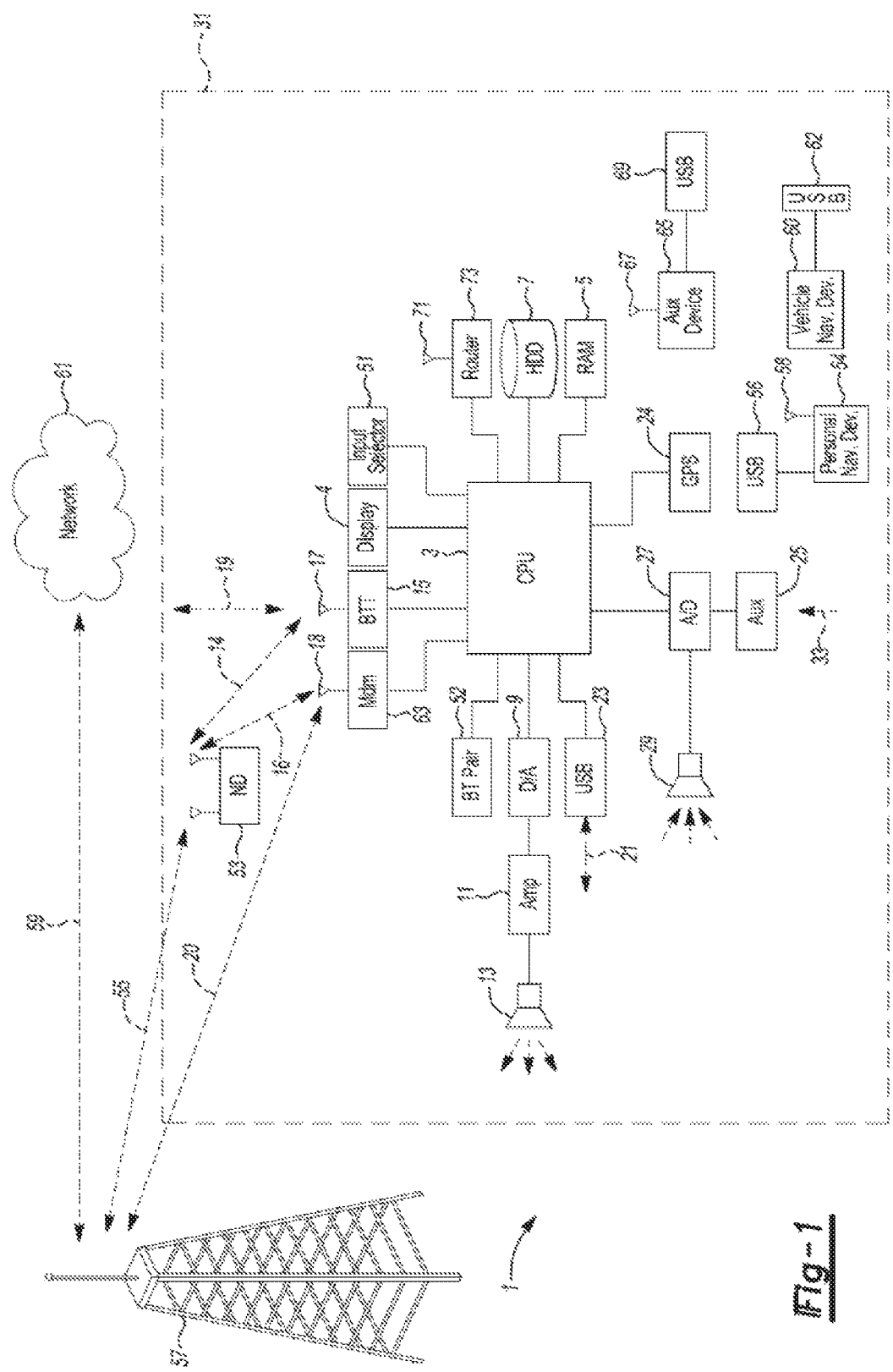
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example communication 55 with a cellular tower 57. In some embodiments, the modem 63 may establish communication 20 with the tower 57 for communicating with network 61. As a non-limiting example modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

The proposed illustrative embodiments include an additional degree of security utilized when authenticating an application's request to connect to a vehicle computer. In previous and existing systems, requesting applications provide an application ID. This ID may have been previously approved by an Original Equipment Manufacturer (OEM) as corresponding to an approved application. If a malicious application utilizes the ID, and there is no additional degree of protection, the vehicle computer or an OEM authentication system may approve the malicious application's access, mistaking the application for a valid application.

In the illustrative embodiments, to "prove" that an application is running on a valid user-intended device, the device itself is provided with a short term authentication code or key. The key is then provided in conjunction with the application request, in order to ensure that the application request came from a real application running on an approved device.

Figure 2:
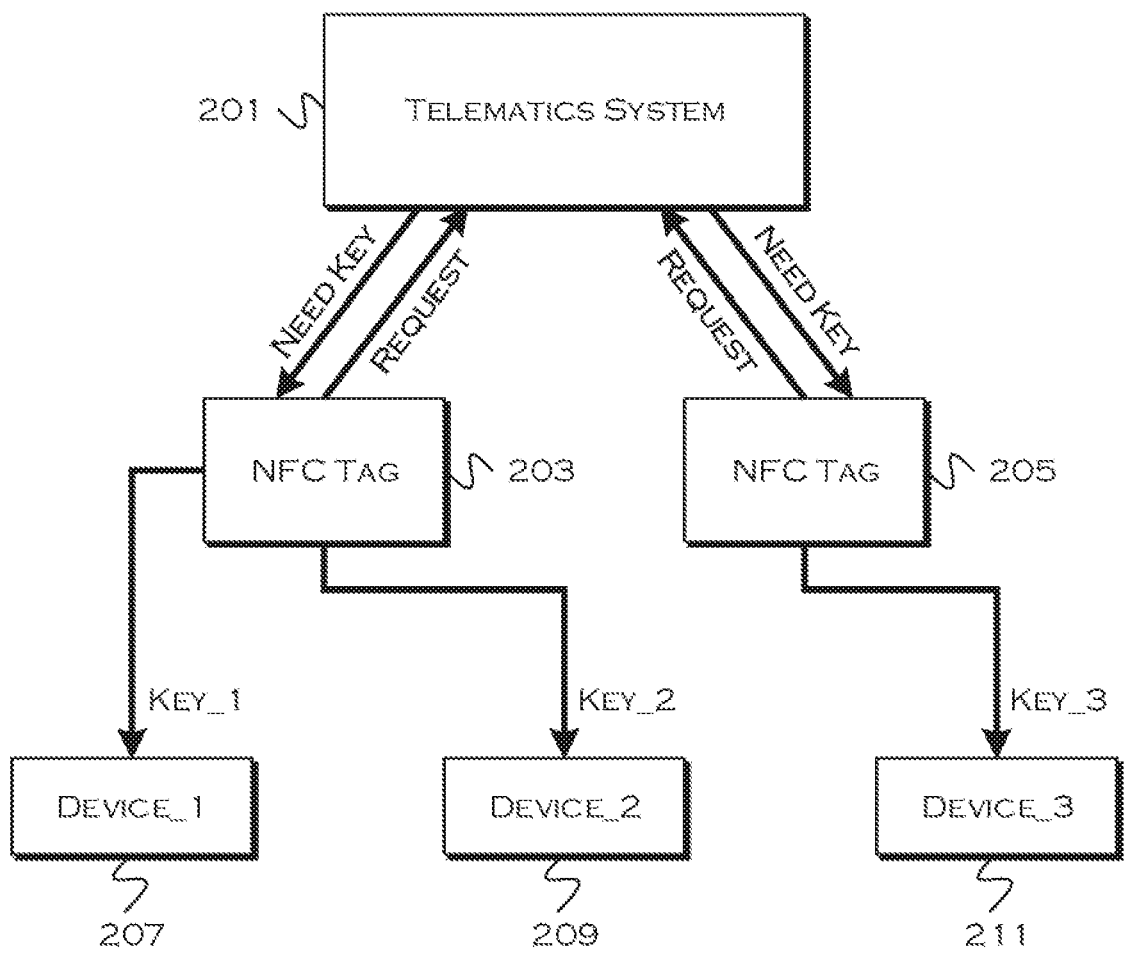
FIG. 2 shows an illustrative example of a vehicle computing system provided with NFC communication points.

FIG. 2 shows an illustrative example of a vehicle computing system provided with NFC communication points. In the illustrative examples, one or more NFC transmission points are included inside a vehicle. These points are located such that they cannot be accessed or utilized from the vehicle's exterior, meaning that a person would have to be inside the vehicle in order to interact with an NFC point. A mobile device with NFC communication capability is placed in proximity to an NFC communication point, at which point a key is communicated from the NFC point to the mobile device. Also, the mobile device ID is communicated to the vehicle computing system, so that the particular key is associated with a particular mobile device ID. Thus, when submitting an authentication request, the mobile device provides the key and ID, and unless the device ID and key both match and are correlated, no access will be provided.

In this illustrative example, a plurality of NFC devices 203, 205, which are capable of receiving programming in the form of a random key, for transmission, and which are capable of receiving a device ID and transmitting it to a vehicle computer, are deployed throughout the vehicle. They can be provided, for example, proximate to seats, in a center console and/or at other locations where access may be convenient, but also which make it impossible to access the points from outside the vehicle.

A vehicle telematics system 201 is included with the system as well. This system is responsible for generating the keys and receiving the device information to be stored in conjunction with the keys. The telematics system also receives access requests from applications, and can validate the keys and device IDs provided with the access requests.

When the vehicle is started, or upon request, the telematics system will generate a first access key. This key is provided to all of the NFC points, or, in another example, to a single NFC point from which a request was received, in the case where the key is generated responsive to a request.

In the system, when a first device 207 is brought proximate to the NFC point 203, the key is provided to the first device. In response, the first device provides a device ID, and the telematics system stores the key and device ID in conjunction. A new key may also be generated at this point, so that each device has a different key. This means that each key only corresponds to a single device, which prevents a second device which may obtain the key through malicious means from utilizing the key, since the device ID will not match.

Accordingly, when a second device 209 requests a key, even if from the same NFC device 203, a new key is provided and stored in conjunction with the device ID. Also, even if the original key was sent to a second programmable NFC device 205, the key is cleared and replaced once the first NFC device 203 has provided the key to the first mobile device 207. Thus, when another device 211 requests a key from the second NFC device 205, a third key is provided to be stored in conjunction with the third device 211 ID.

Figure 3:
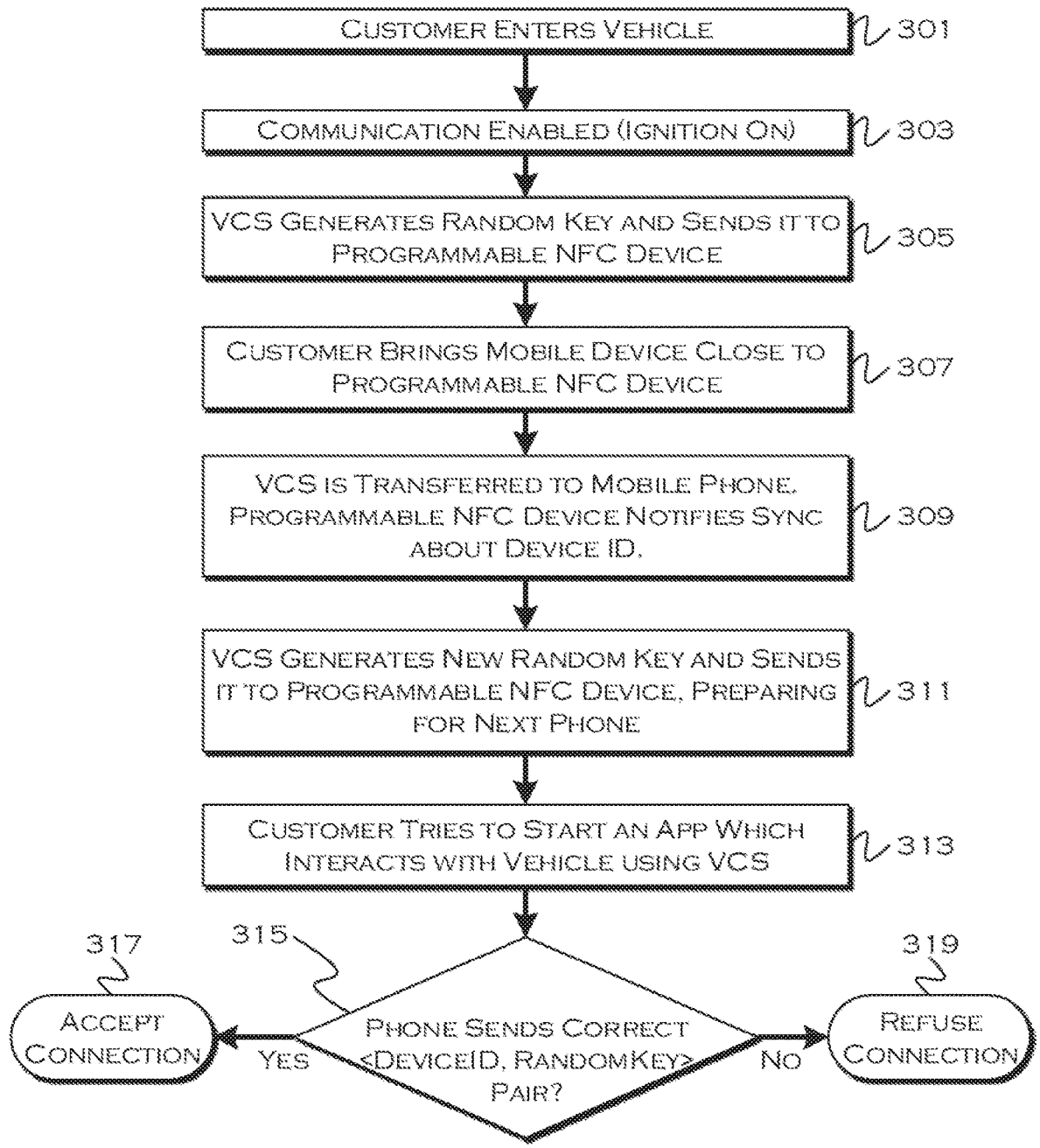
FIG. 3 shows an illustrative example of an application validation process.

FIG. 3 shows an illustrative example of an application validation process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, when an occupant enters a vehicle 301 and turns on the ignition 303, a vehicle computing system generates a first key 305. In other examples, the key may be generated, for example, on request, when a device is brought proximate to an NFC device. In still other examples, the key may be explicitly requested by a user or other reasonable basis for generating the key may be implemented. In any event, the key is utilized for a single device, so regardless of the generation procedure or basis, a new key will be generated or the old key will at least be destroyed once the key is provided, to prevent providing the key to a second device.

In this example, the customer will bring a mobile device in proximity to an NFC device which has been provided with the generated key 307. The key is then transferred to the mobile device 309, which key is stored by the mobile device for later use in authenticating requests from the device. At the same time, the device ID is provided to the telematics system, so that the device ID can be stored in conjunction with the key, for use in validating access requests.

Next, in this process, a new key is generated 311. This key is provided to the NFC device(s) in anticipation of a new device requesting a key. In this manner, any number of devices can be provided with authentication keys, with each device having an independent key associated therewith. The keys can be deleted at the end of an ignition cycle (requiring re-provision of keys whenever the vehicle is later utilized), or, in another example, the key can persist indefinitely or for some predetermined period of time. This persistence may be useful to avoid user annoyance, however, it also somewhat diminishes the security of the system, as it leaves the key on the user device and leaves the device susceptible to being hacked while away from the vehicle.

In still a third example, the telematics system may preserve the device ID and key pair for some period of time, but the mobile device itself may wipe the key when taken away from the vehicle (e.g., when a wireless connection with the vehicle is terminated). Then, when the device later re-establishes the wireless connection, it can broadcast its ID to the vehicle and request an existing key, which can avoid the user having to re-utilize the NFC connection. Again though, this may leave the system open to exploitation, so in a most-secure model, the key-device pair is deleted and the end of an ignition cycle and re-established when the vehicle is used anew. In such an instance, the NFC device may be placed near a cup holder, for example, which is a common place for a user to place a phone, and which can ensure that the NFC device is close enough to the phone to perform the new key request and initiation, without the user having to do any more than simply place the phone in proximity to the cup holder.

At some point during a drive, the user may utilize an application on the mobile device which requests vehicle data or access 313. There are any number of applications, and the applications may also be required to be pre-approved by an OEM for vehicle interaction. When the request is sent, an application ID may be sent, which can be verified with an OEM server on the back-end to ensure that the application itself is a valid application. At the same time, the key and device ID are sent to the telematics system in conjunction with the request. This pair is compared to the stored key and device ID 315 to see if the request is coming from a device that was both inside the vehicle and provided with a proper random key. The assumption is that if a device is in the vehicle, provided with a random key, and is running an application with a valid application ID, then the device is not likely to be maliciously attempting to access the vehicle. If any of the data does not match, the request is rejected 319. If all the data matches, the request is accepted and processed 317.

By utilizing device-specific random keys, which may also only persist for a single ignition cycle, in conjunction with the security protocols already present (such as validating an application ID), the vehicle telematics system can reasonably ensure that an approved application on an approved device is requesting and is approved for vehicular access.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
    a vehicle processor, and
    a near field communication (NFC) transceiver remote from the vehicle processor, wherein the vehicle processor is configured to:
    generate and provide a first random key to the NFC transceiver during vehicle ignition and wherein the NFC transceiver is configured to;
    store the first random key received from the vehicle processor;
    detect a mobile device in communication NFC range with the NFC transceiver; and
    responsive to the detection:
    supply the first random key to the mobile device via NFC for later use in authenticating requests from the mobile device;
    record an identification the mobile device, received via NFC; and
    transmit the identification to the vehicle processor, wherein the vehicle processor is configured to responsively: store the identification as associated with the first random key for use in validating vehicle access requests.

2. The vehicle of claim 1, wherein the processor further is configured to generate a second random key responsive to the storing and send the second random key to the NFC transceiver.

3. The vehicle of claim 2, wherein the NFC transceiver is configured to replace the first random key with a second random key responsive to receiving the second random key.

4. The vehicle of claim 1, wherein the NFC device is located in a vehicle location wherein detection of the mobile device cannot occur from outside the vehicle, based on NFC signal range.

5. The vehicle of claim 1, wherein the processor is configured to generate the first random key when the vehicle is started.

6. The vehicle of claim 1, wherein the processor is configured to delete the stored identification associated with the random key when the vehicle is powered down.

7. A vehicle comprising:
    a vehicle processor: and
    a near field communication (NFC) transceiver remote from the vehicle processor, wherein the vehicle processor is configured to provide a first random key to the NFC transceiver generated during vehicle ignition, responsive to the NFC transceiver reporting detection of a mobile device: and
    wherein the NFC transceiver is configured to:
    store the first random key received from the vehicle processor; and
    responsive to the receiving the first random key:
    supply the random key to the mobile device via NFC for later use in authenticating requests from the mobile device;
    record an identification of the mobile device, received via NFC; and
    transmit the identification to the processor, wherein the vehicle processor is configured to responsively;
    store the identification as associated with the first random key for use in validating vehicle access requests.

8. The vehicle of claim 7, wherein the processor further is configured to generate a second random key responsive to the storing and send the second random key to the NFC transceiver.

9. The vehicle of claim 8, wherein the NFC transceiver is configured to replace the first random key with a second random key responsive to receiving the second random key.

10. The vehicle of claim 7, wherein the NFC device is located in a vehicle location wherein detection of the mobile device cannot occur from outside the vehicle, based on NFC signal range.

11. The vehicle of claim 7, wherein the processor is configured to generate the first random key when the vehicle is started.

12. The vehicle of claim 7, wherein the processor is configured to delete the stored identification associated with the random key when the vehicle is powered down.

13. A method comprising:
generating a first random key during vehicle ignition, via a vehicle processor;
providing the first random key to a near field communication (NIFC) transceiver remote from the vehicle processor, provided as part of a vehicle including the vehicle processor; and
storing the first random key received from the vehicle processor, at the NFC transceiver;
detecting a mobile device in communication NFC range with the NFC transceiver; and
responsive to the detection;
supplying the random key to the mobile device via NFC for later use in authenticating requests from the mobile device;
recording an identification of the mobile device, received via NFC;
transmitting the identification to the vehicle processor; and
storing, via the processor, the identification as associated with the first random key, responsive to receiving the identification for use in validating vehicle access requests.

14. The method of claim 13, further comprising:
Generating, via the processor, a second random key responsive to the storing; and
sending the second random key to the NFC transceiver.

15. The method of claim 14, further comprising replacing the first random key, via the NFC transceiver, with a second random key responsive to receiving the second random key.

16. The method of claim 13, wherein the NFC device is located in a vehicle location wherein detection of the mobile device cannot occur from outside the vehicle, based on NFC signal range.

17. The method of claim 13, further comprising generating the first random key when the vehicle is started.

18. The method of claim 13, further comprising deleting the stored identification associated with the random key when the vehicle is powered down.

* * * * *